United States Patent [19]

Skinner et al.

[11] Patent Number: 4,828,362
[45] Date of Patent: May 9, 1989

[54] OPTICAL SWITCH

[75] Inventors: Jeffrey D. Skinner, London; John S. McCormack, Middlesex, both of England

[73] Assignee: The General Electric Company, p.l.c., England

[21] Appl. No.: 878,119

[22] Filed: Jun. 25, 1986

[30] Foreign Application Priority Data

Jun. 26, 1985 [GB] United Kingdom ............... 8516108

[51] Int. Cl.⁴ .............................................. G02F 1/29
[52] U.S. Cl. .................... 350/320; 350/96.14; 350/96.15; 350/96.17
[58] Field of Search ............... 350/96.13, 96.14, 96.15, 350/96.17, 96.20, 96.21, 320

[56] References Cited

U.S. PATENT DOCUMENTS

| | | | |
|---|---|---|---|
| 3,980,395 | 9/1976 | Giallorenzi et al. | 350/347 R |
| 4,120,560 | 10/1978 | Baues et al. | 350/96.14 |
| 4,201,442 | 5/1980 | McMahon et al. | 350/96.14 |
| 4,278,327 | 7/1981 | McMahon et al. | 350/96.14 X |
| 4,365,862 | 12/1982 | Terui et al. | 350/96.13 |
| 4,455,643 | 6/1984 | Smith et al. | 370/4 |
| 4,693,544 | 9/1987 | Yamasaki et al. | 350/96.13 X |

FOREIGN PATENT DOCUMENTS

| | | | |
|---|---|---|---|
| 0015139 | 9/1980 | European Pat. Off. | |
| 3036867 | 5/1982 | Fed. Rep. of Germany | 350/96.15 |
| 57-147618 | 9/1982 | Japan | 350/96.13 |
| 58-40725 | 9/1983 | Japan | 350/96.13 |
| 58-184124 | 10/1983 | Japan | 350/96.14 |
| 59-41170 | 10/1984 | Japan | 350/96.13 |

OTHER PUBLICATIONS

Naitoh et al., "Mirror-Type Optical Switch Array", Applied Optics, vol. 17, No. 24, Dec. 15, 1978, pp. 3975-3978.
R. A. Becker & W. S. C. Chang, "Electro-Optical Switching in Thin Film Waveguides for a Computer Communication Bus", Applied Optics, vol. 18, No. 19, Oct. 1, 1979, pp. 3296-3300.
M. Kobayashi, H. Terui, M. Kawachi and J. Noda, "2x2 Optical Waveguide Matrix Switch Using Nematic Liquid Crystal", IEEE Journal of Quantum Electronics, QE-18, No. 10, Oct. 1982, pp. 1603-1610.
R. A. Soref, "Liquid-Crystal Fiber-Optic Switch", Optics Letters, vol. 4, No. 5, May 1979, pp. 155-157.
C. S. Tsai et al., IEEE Journal of Quantum Electronics, vol. QE-14, No. 7, Jul. 1978, pp. 513-517, "Optical Channel Waveguide Switch . . . ".
S. K. Sheem, "Total Internal Reflection Integrated-Optics Switch", Applied Optics, vol. 17, No. 22, Nov. 1978, pp. 3679-3687.

Primary Examiner—John D. Lee
Attorney, Agent, or Firm—Kirschstein, Kirschstein, Ottinger & Israel

[57] ABSTRACT

An optical switching device comprises an optical waveguide formed from two light-transmitting materials having an interface between them, and in which the refractive index of one of the materials can be altered by an external influence; the other has a light path directed at the interface at an angle such that by varying the refractive index of the first material the light can either pass through the material or be reflected at the interface. By utilizing a plurality of such interfaces in sequence the light may be selectively switched along several different paths.

4 Claims, 2 Drawing Sheets

1

OPTICAL SWITCH

BACKGROUND OF THE INVENTION

Field of the Invention

This invention relates to an optical switching device.

Summary of the Invention

According to the invention an optical switching device comprises an optical waveguide incorporating two light transmitting materials with an interface between them, the refractive index of one of which materials can be altered by an external influence, and the other of which has a light path directed at said interface at an angle such that, at one value of refractive index of said one material the light path passes through the interface, but at another value of the refractive index of said one material the light is reflected at said interface in a different direction, the device incorporating or being associated with means for altering the refractive index of said one material from one said value to the other.

The said one material, hereinafter referred to as the switching material, can be one whose refractive index can be altered by an electro-optical or a magneto-optical effect, that is to say one whose refractive index can be varied by the application of an electric or a magnetic field respectively.

Alternatively the switching material may be one whose refractive index can be altered by incident light of an appropriate wavelength. Switching materials having refractive indices variable by other means could also be employed in some cases.

The device may, for example, comprise a planar optical waveguide (single or multimode) having one or more channels formed in it to the depth of the waveguide material, the channel or channels containing said switching material, the waveguide material having a refractive index which is equal to the higher of two said values of refractive index of the switching material, means being provided for directing light along a path having an angle of incidence $\theta$ with the interface such that $$\theta > \sin^{-1} N_{II}/N_I$$

where $N_I$ and $N_{II}$ are the lower and higher values of refractive index of the switching material respectively.

Accordingly when the refractive index of the switching material is at the higher of the two values no index discontinuity is encountered at the interface and the light, which may be linearly polarized, continues along its original path, whereas when the refractive index of the switching material is at the lower of the two values the light will be internally reflected at the interface and follow a different path.

The waveguide material may have a plurality of parallel grooves each containing switching material. By this means, as will be subsequently described, light directed along one path within the waveguide material can be switched along a plurality of different paths by changing the refractive index of the switching material in different or different combinations of grooves.

The invention is also applicable to devices incorporating channel waveguides instead of planar waveguide technology, the channel waveguides conveniently being associated with optical fibres for directing light into and away from input and output channels of the device, and the device incorporating a groove containing a switching material for effecting switching from one output channel to another.

The switching material could be liquid crystal or an organic material such as meta-nitroaniline (MNA).

BRIEF DESCRIPTION OF THE DRAWINGS

A number of different embodiments of the invention will now be described by way of example with reference to FIGS. 1 to 5 of the accompanying schematic drawings, in which.

DETAILED DESCRIPTION OF THE PREFERRED EMBODIMENTS

Figure 1:
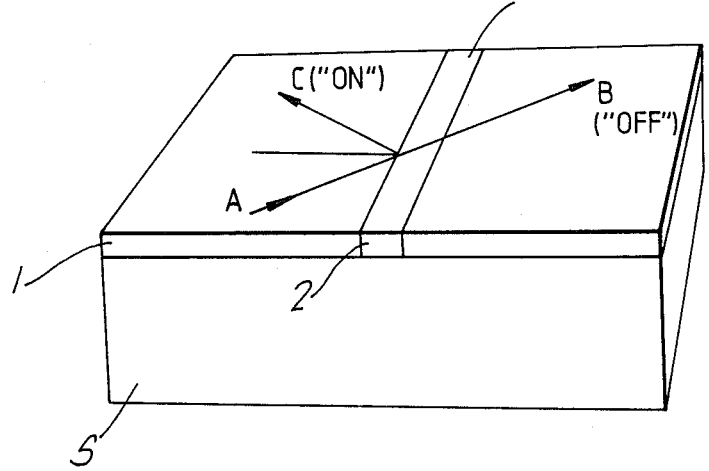
FIG. 1 illustrates a perspective view, not to scale, of a simple form of optical switch in accordance with the invention.

Referring first to FIG. 1 the switch incorporates a planar optical waveguide structure (single or multimode) comprising a waveguide formed as a thin layer 1 on a substrate 5. The waveguide layer 1 has a channel 2 formed in it to a depth similar to the thickness of the waveguide (for example, by laser processing, plasma etch or mechanical cutting techniques). The channel is typically 20 μm wide. This is then filled with a switching material 3 whose refractive index can be altered between two states (say $N_I$ and $N_{II}$) by an electro-optic effect. Such a material could be liquid crystal or organic material (e.g. MNA). It may then be polished to the level of the surrounding waveguide, or in the case of a liquid crystal, a silica plate attached to he surface of the guide in order to contain the liquid. The waveguide material is chosen to be equal to the greater, $N_{II}$ of the two refractive indices of the switching material 3 in the channel 2. Thus the waveguide material may be (Ta$_2$O$_5$)$_x$(SiO$_2$)$_{1-x}$ deposited by RF sputtering or by any other suitable process whose refractive index can be continuously varied between 1.47 and 2.1 by altering x.

Figure 2:
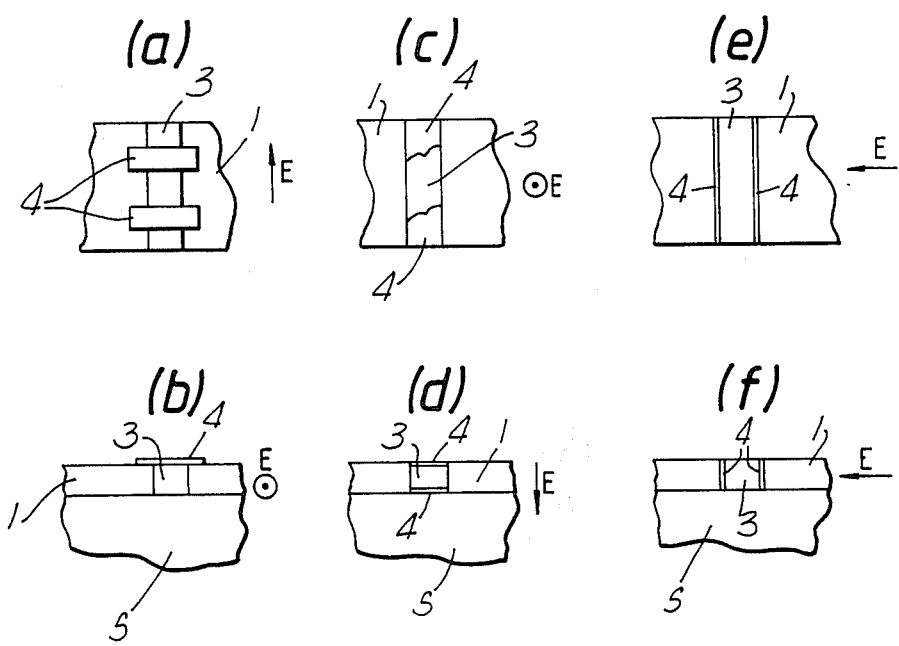
FIGS. 2(a)–2(f) illustrate three methods of applying an electric field to the switching material of the device.

The switching material 3 is switched between its two states, $N_I$ and $N_{II}$ by applying a voltage between two electrodes 4 placed adjacent to the channel in one of the three configurations shown in FIG. 2. Thus in this Figure (a) and (b) represent a plan view and an end view of one configuration, and (c) and (d), and (e) and (f) represent similar views of the other two configurations, the direction of the applied electric field being indicated at E.

Exact electrode arrangement depends on the orientation of the liquid crystal or organic electrooptic material used. In the following description, it is assumed that the material has a negative electro-optic coefficient, that is to say one whose refractive index decreases with an increase in the electric field across it. If the material has a positive coefficient then the electrode voltage conditions for "OFF" and "ON" states are reversed.

Light may be launched into the waveguide, for example, using a prism coupling technique (not shown) along a path A. It is linearly polarized in such a direction that it sees the switching material refractive index as $N_{II}$. Consequently, there is no index discontinuity encountered, and the light continues along path B, where it may be coupled out of the waveguide with a second prism.

The switch is turned "ON" by applying a voltage to the electrodes 4. The guiding light now sees an index $N_I$ ($N_I < N_{II}$), and if the angle of incidence, $\theta$ is such that $$\theta < \sin^{-1} N_{II}/N_I$$

light will be totally internally reflected, and be directed along path C. Increasing the voltage further will have no effect on the switching characteristics, consequently, the switch does not impose a tight tolerance on switching voltage.

Figure 3:
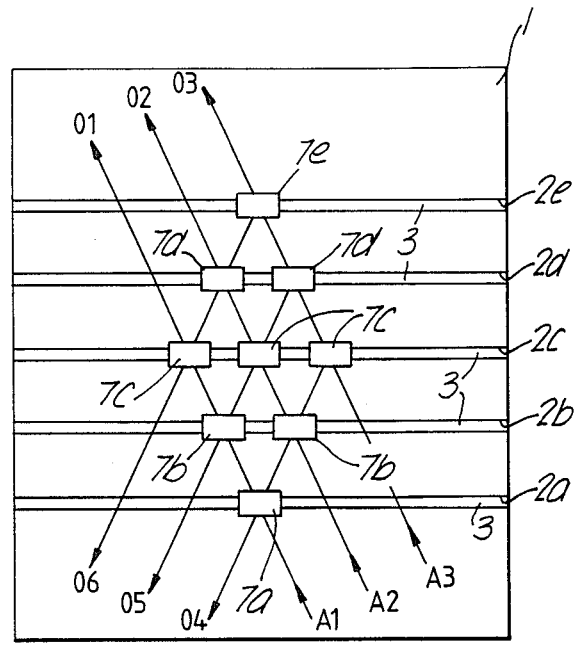
FIG. 3 represents a plan view of a nonblocking 2×2 switch.

The switch described forms the basis of a non-blocking 2×2 type. The structure may be extended to an n x n using the configuration as shown in FIG. 3. In this case, the waveguide layer has a plurality, in this case five, grooves 2a–2e, and three light inputs A1, A2, A3. The central groove 2c has three switching positions 7c, the adjacent grooves 2b, 2d, two switching positions 7b, 7d and the outermost grooves 2a, 2e one 7a, 7e switching position respectively, each associated with respective electrodes so that each intersection of the light paths with the grooves is separately addressable. By appropriately varying the refractive index of the switching material 3 at the appropriate intersection it will be seen that the light from each of the inputs can be directed either along a respective output path 01, 02, 03 or diverted along any one of the three output paths 04 to 06.

Figure 4:
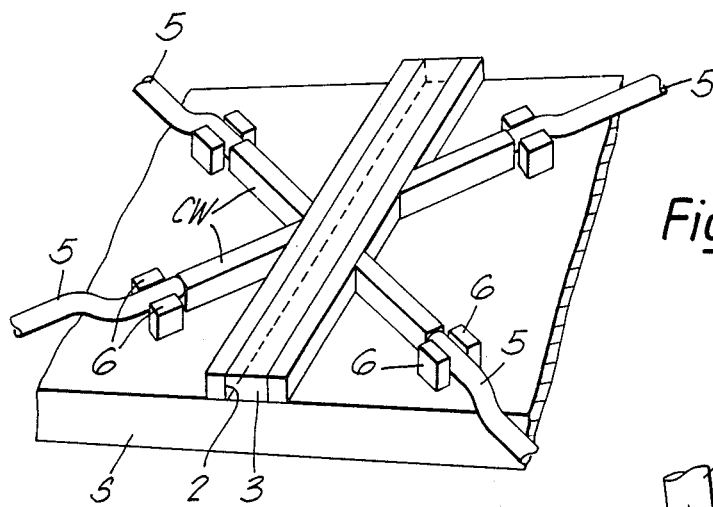
FIGS. 4 and 5 represent views of two other forms of switch.

The structure may be further developed to incorporate channel waveguides CW and butt coupled optical fibres 5, as shown in FIG. 4, instead of planar waveguide technology. This illustrates a 2×2 switch of this type the fibres being held in abutment with the ends of the waveguides by fibre holding blocks 6 in known manner. The channel waveguides CW, the fibre holding blocks 6 and channel 2 can be formed by the same process as above described using reactive plasma etching.

Figure 5:
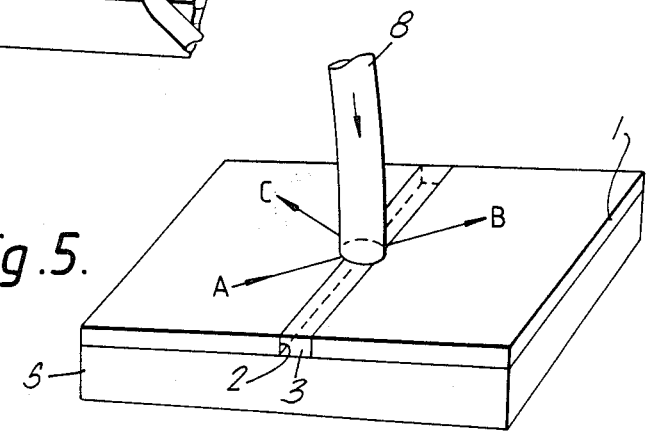

Alternatively, if the channel 2 of the embodiment illustrated in FIG. 1 is filled with a photo-refractive material, guiding light of a higher optical wavelength could be switched by illuminating the switch material 3 with light of a smaller wavelength which causes the change in refractive index. This activating light L would be supplied by a fibre 8 held immediately above each operation point as shown in FIG. 5 or alternatively the activating light could be input with the waveguiding light, using wavelength multiplexing.

Switching may also be achieved in other ways, using the same structure. Thus in a modification of the invention above described the channel or channels may be filled with a highly birefringent material, then switching between the two states will take place if the input polarization of the light is changed. This could be achieved using an electro-optic or magneto-optic effect.

We claim:

1. A method of manufacturing an optical switching device from a single substrate lying in a plane, comprising the steps of:
    forming a layer of waveguide material on the substrate to a predetermined depth and having at least one channel with a depth substantially equal to said predetermined depth, the waveguide layer further defining a plurality of channel waveguides inclined with respect to the channel, at least two of which are aligned and are disposed on opposite sides of the channel for optical transmission from one to the other across the channel;
    filling the said at least one channel with a switching material having a variable refractive index so that it borders the waveguide material along two parallel interfaces; and
    placing, adjacent said switching material, means for altering the refractive index of the switching material by the application of an external field between
        (i) one value of refractive index for allowing light in said plane to pass from one to the other of said two aligned channel waveguides, and
        (ii) another value of refractive index for causing said light directed along one of said channel waveguides at one of said interfaces to be reflected therefrom in a different direction while remaining in said plane.

2. A method according to claim 1 comprising butt-coupling an optical fibre to each channel waveguide.

3. A method according to claim 1, in which the refractive index altering means comprises a pair of electrodes disposed across the channel at the surface of said channel and spaced lengthwise of the channel.

4. A method according to claim 1, in which the refractive index altering means comprises a pair of electrodes disposed across the channel respectively at the surface and at the base of said channel, one electrode overlying the other.

* * * * *